US012798207B2

(12) United States Patent
Naruse et al.

(10) Patent No.: US 12,798,207 B2
(45) Date of Patent: Nov. 17, 2026

(54) PNEUMATIC TIRE AND METHOD OF MANUFACTURING THE SAME

(71) Applicant: The Yokohama Rubber Co., LTD., Tokyo (JP)

(72) Inventors: Masahiro Naruse, Hiratsuka (JP); Takashi Hoshiba, Hiratsuka (JP); Jun Matsuda, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 769 days.

(21) Appl. No.: 17/262,177

(22) PCT Filed: Jul. 17, 2019

(86) PCT No.: PCT/JP2019/028157
§ 371 (c)(1),
(2) Date: Jan. 21, 2021

(87) PCT Pub. No.: WO2020/022163
PCT Pub. Date: Jan. 30, 2020

(65) Prior Publication Data

US 2021/0291470 A1 Sep. 23, 2021

(30) Foreign Application Priority Data

Jul. 24, 2018 (JP) ................................ 2018-138613

(51) Int. Cl.
*B29D 30/00* (2006.01)
*B60C 19/00* (2006.01)

(52) U.S. Cl.
CPC .......... *B29D 30/0061* (2013.01); *B60C 19/00* (2013.01); *B29D 2030/0077* (2013.01); *B60C 2019/004* (2013.01)

(58) Field of Classification Search
CPC ....... B60C 11/24; B60C 11/243; B60C 19/00; B60C 2019/004; B29D 30/0061; B29D 2030/0072; B29D 2030/0077; B29D 2030/0083
USPC .......................................................... 152/450
See application file for complete search history.

(56) References Cited

U.S. PATENT DOCUMENTS

2005/0093761 A1 5/2005 King et al.
2006/0290505 A1* 12/2006 Conwell .......... G06K 19/07764 340/572.1
2007/0146124 A1* 6/2007 Shinmura ........... B60C 23/0493 340/447

(Continued)

FOREIGN PATENT DOCUMENTS

DE 60310957 T2 8/2007
DE 102015217474 A1 3/2017

(Continued)

OTHER PUBLICATIONS

Hatanaka H, JP-4240414-B1, machine translation. (Year: 2009).*

(Continued)

*Primary Examiner* — Sedef E Paquette
(74) *Attorney, Agent, or Firm* — Thorpe North & Western

(57) ABSTRACT

Provided are a pneumatic tire and a method of manufacturing the same is provided. An information display unit is configured to display, in a tire surface, information relating to attachment of a sensor unit configured to acquire tire information.

17 Claims, 9 Drawing Sheets

(56) References Cited

U.S. PATENT DOCUMENTS

| | | | | |
|---|---|---|---|---|
| 2008/0302177 | A1* | 12/2008 | Sinnett | B60C 11/243 73/146 |
| 2012/0298272 | A1* | 11/2012 | Tanno | B60C 23/0493 152/450 |
| 2013/0319085 | A1* | 12/2013 | Schwab | B60C 23/04 73/49 |
| 2015/0075693 | A1* | 3/2015 | Dorfi | B60C 13/001 156/60 |
| 2016/0207362 | A1* | 7/2016 | Leffler | B60C 11/00 |
| 2016/0318356 | A1 | 11/2016 | McMillen | |
| 2017/0057304 | A1* | 3/2017 | So | B60C 23/0493 |
| 2017/0355238 | A1* | 12/2017 | Wei | B60C 23/0493 |
| 2018/0186200 | A1 | 7/2018 | Brusarosco et al. | |
| 2019/0329609 | A1* | 10/2019 | Puppi | B29D 30/0061 |
| 2021/0039451 | A1* | 2/2021 | Soini | B60C 23/0488 |

FOREIGN PATENT DOCUMENTS

| | | | | | |
|---|---|---|---|---|---|
| JP | 2006162387 | A | * | 6/2006 | |
| JP | 4240414 | B1 | * | 3/2009 | B60C 11/243 |
| JP | 2015116689 | A | * | 6/2015 | |
| JP | 2017013681 | A | * | 1/2017 | |
| WO | WO-2018224601 | A1 | * | 12/2018 | B23K 26/032 |

OTHER PUBLICATIONS

Hashimura Y, JP-2006162387-A, machine translation. (Year: 2006).*

Nakashima D, JP-2017013681-A, machine translation. (Year: 2017).*

Sakakibara K, JP-2015116689-A, machine translation. (Year: 2015).*

Kraus A, WO-2018224601-A1, machine translation. (Year: 2018).*

USPTO, Legal Analysis and Writing, Part I: Understanding Case Law and the Federal Court System, Computer Based Training, posted Jan. 3, 2017 (https://www.uspto.gov/patents/laws/examination-policy/examination-guidance-and-training-materials). (Year: 2017).*

International Search Report for International Application No. PCT/JP2019/028157 dated Oct. 21, 2019, 4 pages, Japan.

* cited by examiner

PNEUMATIC TIRE AND METHOD OF MANUFACTURING THE SAME

FIELD OF THE TECHNOLOGY

The present technology relates to a pneumatic tire and a method of manufacturing the same and particularly relates to a pneumatic tire and a method of manufacturing the same that can provide improved productivity when a sensor unit configured to acquire tire information is attached to a tire inner surface.

BACKGROUND OF THE TECHNOLOGY

To acquire tire internal information such as internal pressure and temperature, installation of various types of sensors in a tire cavity is performed (for example, see Japan Patent No. 6272225 and Japan Unexamined Patent Publication No. 2016-505438).

In general, a specification of a sensor unit installed in a tire inner surface differs in accordance with tire size. When the sensor unit is attached to the tire inner surface, it is required to discriminate the sensor unit in accordance with tire size. Additionally, in some cases, an installation position of a sensor unit, an installation direction of a sensor unit, and the number of installed sensor units also differ in accordance with the type of tire and the structure of a sensor unit. However, such information relating to attachment of a sensor unit cannot be discriminated from the tire itself. In general, the information is confirmed based on reference information on work site. Thus, when a sensor unit is installed in a tire inner surface, it is required to discriminate a specification of the sensor unit, and to confirm installation conditions of the sensor unit and the like. This causes a decrease in productivity of a pneumatic tire.

SUMMARY

The present technology provides a pneumatic tire and a method of manufacturing the same that can provide improved productivity when a sensor unit configured to acquire tire information is attached to a tire inner surface.

A pneumatic tire according to an embodiment of the present technology includes an information display unit configured to display, in a tire surface, information relating to attachment of a sensor unit configured to acquire tire information.

A method of manufacturing a pneumatic tire according to an embodiment of the present technology includes vulcanizing a green tire by using a bladder in which an information display unit is engraved in an outer surface of the bladder, the information display unit being configured to display information relating to attachment of a sensor unit configured to acquire tire information, and fixing a sensor unit to an inner surface of the pneumatic tire vulcanized, based on information of the information display unit transferred to a tire inner surface.

In an embodiment of the present technology, an information display unit configured to display, in a tire surface, information relating to attachment of a sensor unit configured to acquire tire information is provided. Thus, in a case where the sensor unit is attached to a tire inner surface, the information of the information display unit is confirmed, and thus installation work can be performed accurately and efficiently in accordance with tire size. Accordingly, the productivity of a pneumatic tire including a sensor unit in a tire inner surface can be improved. Further, incorrect installation of a sensor unit can be prevented.

In an embodiment of the present technology, the information display unit is preferably disposed in a tire inner surface. Accordingly, in a case where the sensor unit is provided in the tire inner surface, productivity can be improved effectively.

In an embodiment of the present technology, the information display unit is preferably formed of a protrusion portion and/or a recess portion. Accordingly, since the information display unit is formed integrally with the tire inner surface, sufficient durability can be ensured.

In an embodiment of the present technology, a root portion of the protrusion portion or the recess portion constituting the information display unit preferably has curvature. Accordingly, generation of a crack can be prevented, and the durability of the pneumatic tire can be improved effectively.

In an embodiment of the present technology, the information display unit preferably includes an indicator being an indication of an attachment region of the sensor unit. Accordingly, the attachment region of the sensor unit is clear, and work in attachment of the sensor unit becomes easy.

In an embodiment of the present technology, a platform corresponding to the attachment region of the sensor unit is preferably formed as the indicator, and the platform is preferably formed of a protrusion portion or a recess portion. Accordingly, the attachment region of the sensor unit is clear, and work in attachment of the sensor unit becomes easy.

In an embodiment of the present technology, a root portion of the platform preferably has curvature. Accordingly, generation of a crack can be prevented, and the durability of the pneumatic tire can be improved effectively.

In an embodiment of the present technology, at least one of the sensor units corresponding to information of the information display unit is preferably fixed to a tire inner surface. The sensor unit is attached to the tire inner surface in correspondence to the information of the information display unit. Thus, productivity can be improved effectively.

In an embodiment of the present technology, the sensor unit is preferably bonded to the tire inner surface via an adhesive layer. Accordingly, the sensor unit can be attached securely to the tire inner surface.

In an embodiment of the present technology, the adhesive layer preferably has adhesive strength ranging from 0.4 $N/mm^2$ to 100 $N/mm^2$. Accordingly, installation work of the sensor unit can be performed easily while maintaining good adhesive strength of the adhesive layer. The adhesive strength (tensile shear adhesive strength) of the adhesive layer is in accordance with any of JIS (Japanese Industrial Standard)-K6850 and JIS-Z0237, and is adhesive strength measured under standard conditions (23° C., RH 50%).

In an embodiment of the present technology, the adhesive layer is preferably formed of a cyanoacrylate-based adhesive. Accordingly, a time period of installation work of the sensor unit can be reduced.

In an embodiment of the present technology, the sensor unit is preferably disposed in an inner side of a ground contact edge in a tire width direction. Accordingly, in a case where a sensor detects an amount of wear of a tread portion, the sensor can acquire tire information accurately.

In an embodiment of the present technology, the sensor unit is preferably directly bonded to the tire inner surface.

Accordingly, in a case where a sensor detects an amount of wear of a tread portion, the sensor can acquire tire information accurately.

In an embodiment of the present technology, a base is preferably inserted between the sensor unit and the adhesive layer. Accordingly, in a case where a material that enables following tire deformation is used as a material of the base, peeling of the sensor unit due to the tire deformation can be prevented.

In an embodiment of the present technology, as roughness of the tire inner surface in a fixing region of the sensor unit, an arithmetic average height Sa preferably ranges from 0.3 μm to 15.0 μm, and a maximum height Sz preferably ranges from 2.5 μm to 60.0 μm. Accordingly, the adhesion area of the tire inner surface and the adhesive layer can be increased, and the adhesiveness of the tire inner surface and the sensor unit can be improved effectively. The roughness of the tire inner surface is measured in accordance with ISO (International Organization for Standardization) 25178. The arithmetic average height Sa is an average of absolute values of differences in the height at points with respect to an average surface of a surface. The maximum height Sz is a distance in a height direction from the highest point to the lowest point of the surface.

In an embodiment of the present technology, at least in a fixing region of the sensor unit, a thickness of a release agent is preferably equal to or less than 100 μm, the thickness being detected by an electron microscope. Alternatively, at least in a fixing region of the sensor unit, an amount of silicon in a release agent is preferably equal to or less than 10.0 wt. %, the amount being detected by an X-ray fluorescent analysis. In a case where a very small amount of the release agent is applied to the tire inner surface as described above, the release agent inhibits permeation of air from the tire inner surface, and good air retention properties can be achieved, while the adhesiveness of the tire inner surface and the sensor unit can be ensured sufficiently.

In an embodiment of the present technology, ground contact edge refers to an end portion in the tire axial direction when a regular load is applied to a tire that is vertically placed on a flat surface in a state where the tire is mounted on a regular rim and inflated to regular internal pressure. "Regular rim" refers to a rim defined by a standard for each tire according to a system of standards that includes standards with which tires comply, and, for example, is a "standard rim" in the case of the Japan Automobile Tyre Manufacturers Association Inc. (JATMA), a "Design Rim" in the case of the Tire and Rim Association, Inc. (TRA), and a "Measuring Rim" in the case of the European Tyre and Rim Technical Organisation (ETRTO). In the system of standards that includes standards with which tires comply, "regular internal pressure" refers to air pressure defined by each of the standards for each tire and is maximum air pressure in the case of JATMA, the maximum value shown in the table "TIRE LOAD LIMITS AT VARIOUS COLD INFLATION PRESSURES" in the case of TRA, and "INFLATION PRESSURE" in the case of ETRTO. In a case where a tire is for a passenger vehicle, the regular internal pressure is 250 kPa. In the system of standards that includes standards with which tires comply, "Regular load" is a load defined by each of the standards for each tire, and is maximum load capacity in the case of JATMA, the maximum value shown in the table of "TIRE LOAD LIMITS AT VARIOUS COLD INFLATION PRESSURES" in the case of TRA, and "LOAD CAPACITY" in the case of ETRTO. In a case where a tire is for a passenger vehicle, the regular load corresponds to 80% of the load described above.

BRIEF DESCRIPTION OF THE DRAWINGS

FIG. 2A illustrates a case where information relating to attachment of a sensor unit is a protrusion portion, and FIG. 2B illustrates a case where information relating to attachment of a sensor unit is a recess portion.

DETAILED DESCRIPTION

Figure 1:
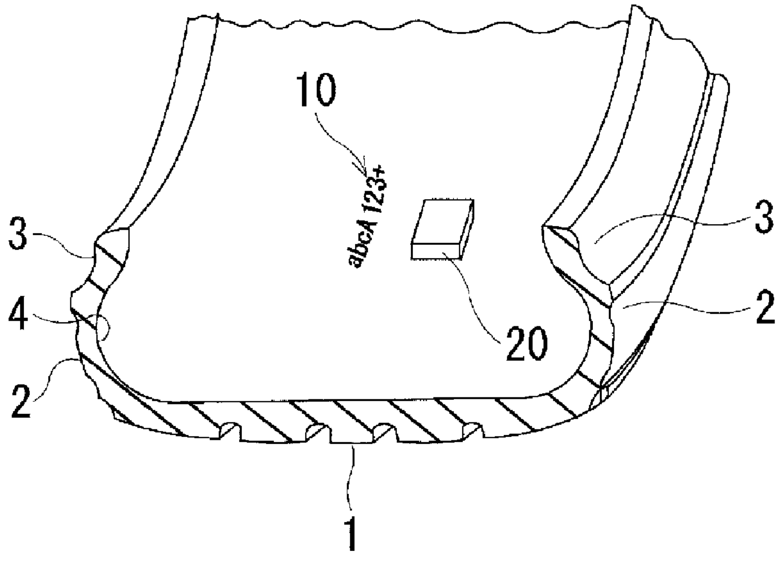
FIG. 1 is a perspective cross-sectional view of an example of a pneumatic tire according to an embodiment of the present technology.

Configurations of embodiments of the present technology will be described in detail below with reference to the accompanying drawings. FIG. 1 illustrates a pneumatic tire according to an embodiment of the present technology. In FIG. 1, the pneumatic tire of the present embodiment includes a tread portion 1 having an annular shape and extending in the tire circumferential direction, a pair of sidewall portions 2 disposed in both sides of the tread portion 1, and a pair of bead portions 3 disposed in inner sides of the sidewall portions 2 in the tire radial direction. At least one sensor unit 20 is fixed to a tire inner surface 4 via an adhesive layer 6.

In the tire inner surface 4, an information display unit 10 configured to display, in a tire surface, information relating to attachment of the sensor unit 20 configured to acquire tire information is formed. As the information display unit 10, alphanumerics, numerals, symbols, and patterns for discriminating a specification of the sensor unit 20 are exemplified. The alphanumerics may any of hiragana characters, katakana characters, or kanji characters. The information display unit 10 described above can be formed by engraving or printing, or as a sticker. Particularly, in a case of engraving, the information display unit 10 is formed integrally with the tire inner surface 4 by using a bladder including the information display unit 10, or by irradiating the tire inner surface 4 with laser light, and thus sufficient durability can be ensured.

Figure 2A:
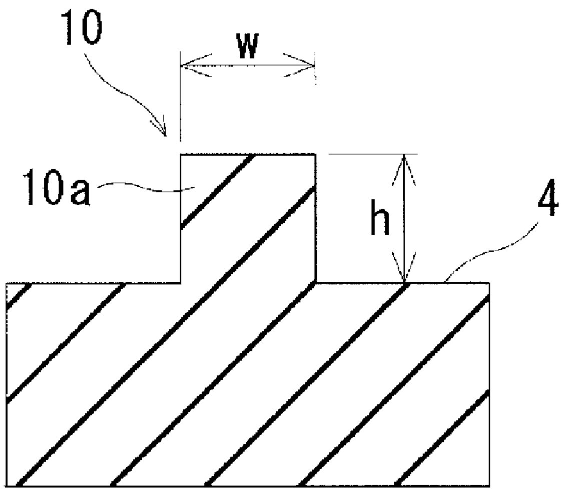
FIGS. 2A and 2B are cross-sectional views each illustrating a part of a pneumatic tire according to an embodiment of the present technology in an enlarged manner.
Figure 2B:
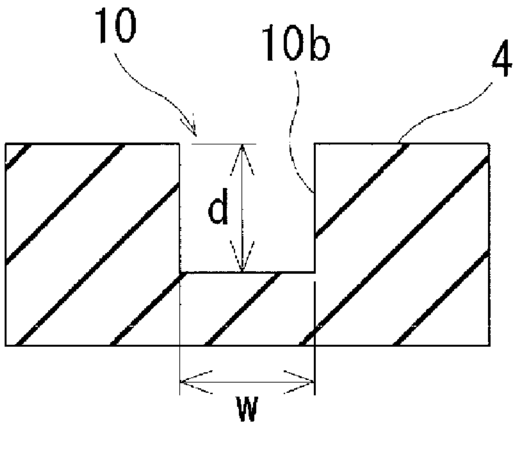

For example as illustrated in FIGS. 2A and 2B, the information display unit 10 is formed of a protrusion portion 10*a*, a recess portion 10*b*, or a combination of the protrusion portion 10*a* and the recess portion 10*b*. As illustrated in FIG. 2A, the protrusion portion 10*a* protrudes from the tire inner surface 4. As illustrated in FIG. 2B, the recess portion 10*b* is recessed from the tire inner surface 4. The protrusion portion 10*a* preferably has a height h from 0.1 mm to 2.0 mm, and more preferably, from 0.3 mm to 0.8 mm. The recess portion 10*b* preferably has a depth d from 0.1 mm to 2.0 mm, and more preferably from 0.3 mm to 0.8 mm. Additionally, a width w of the protrusion portion 10*a* or the recess portion 10*b* is preferably from 0.5 mm to 3.0 mm.

The adhesive layer 6 may be formed of a liquid-based adhesive or a double-sided adhesive tape. As the adhesive, a reactive curing adhesive including an epoxy resin or a urethane resin is exemplified. Particularly, the adhesive layer 6 is preferably formed of a cyanoacrylate-based adhesive (instant adhesive) to reduce the work time period of installing the sensor unit 20 in the tire inner surface 4.

Figure 3:
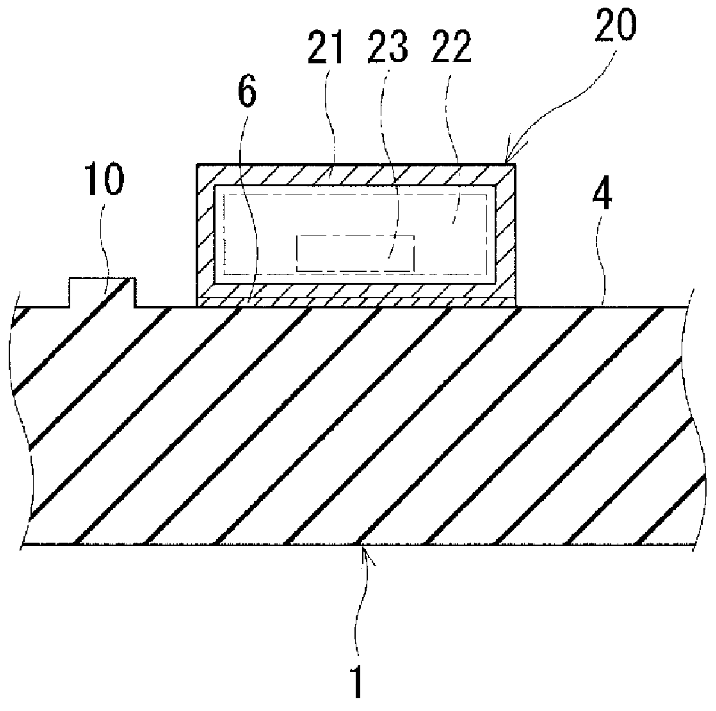
FIG. 3 is a cross-sectional view illustrating a sensor unit attached to a pneumatic tire according to an embodiment of the present technology in an enlarged manner.

As illustrated in FIG. 3, the sensor unit 20 includes a housing 21 and an electronic component 22. The housing 21 includes a hollow structure, and accommodates the electronic component 22. The electronic component 22 includes a sensor 23 configured to acquire tire information, a transmitter, a receiver, a control circuit, a battery, and the like as appropriate. Examples of the tire information acquired by the sensor 23 can include internal temperature and internal pressure of the pneumatic tire, and an amount of wear of the tread portion 1. For example, a temperature sensor or a pressure sensor is used to measure the internal temperature or the internal pressure. In the case of detecting an amount of wear of the tread portion 1, a piezoelectric sensor that abuts against the tire inner surface 4 may be used as the sensor 23. The piezoelectric sensor detects an output voltage corresponding to deformation of the tire during travel, and detects an amount of wear of the tread portion 1, based on the output voltage. In addition, an acceleration sensor or a magnetic sensor can also be used. Additionally, the sensor unit 20 is configured to transmit the tire information acquired by the sensor 23, to the outside of the tire. Note that the internal structure of the sensor unit 20 illustrated in FIG. 3 is an example of a sensor unit, and is not limited to this.

The pneumatic tire described above includes the information display unit 10 configured to display, in the tire inner surface 4, the information relating to attachment of the sensor unit 20. Thus, when the tire inner surface 4 is checked, a specification of the sensor unit 20 can be discriminated easily. Thus, when the sensor unit 20 is attached to the tire inner surface 4, installation work can be performed accurately and efficiently in accordance with tire size. Accordingly, the productivity of the pneumatic tire including the sensor unit 20 in the tire inner surface 4 can be improved. Particularly, in a case where an attachment position of the sensor unit 20 is designated, installation at a faulty position or in a faulty direction can be prevented.

Figure 4:
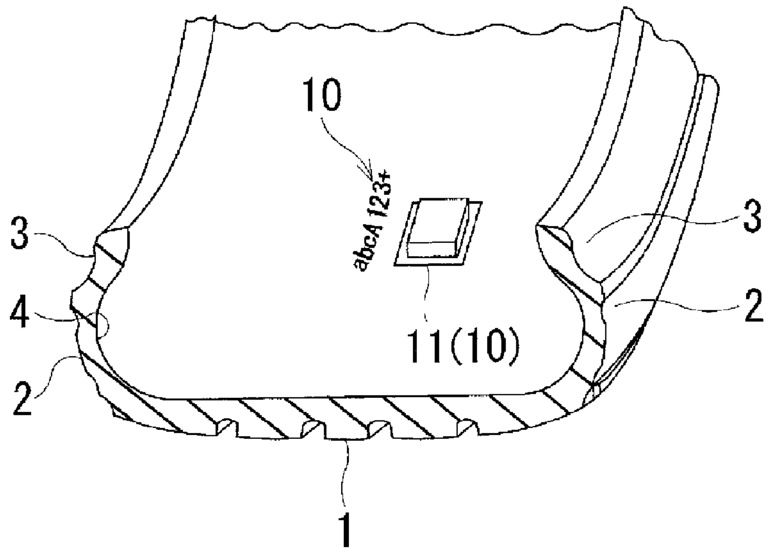
FIG. 4 is a perspective cross-sectional view of a modified example of a pneumatic tire according to an embodiment of the present technology.
Figure 5A:
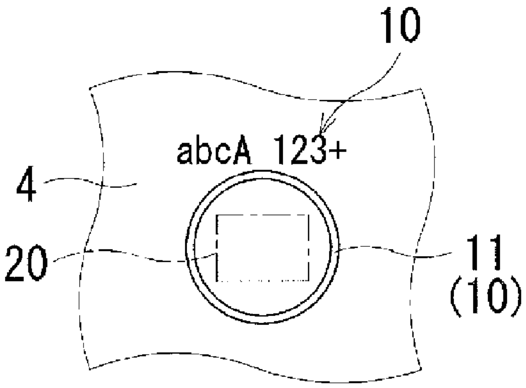
FIGS. 5A to 5D illustrate modified examples of an information display unit of a pneumatic tire according to an embodiment of the present technology. Each of FIGS. 5A to 5D is a plan view of a modified example.
Figure 5B:
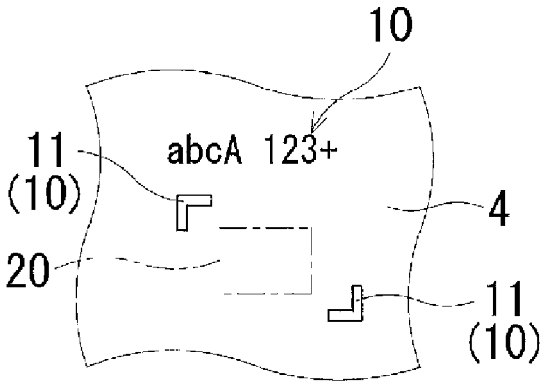
Figure 5C:
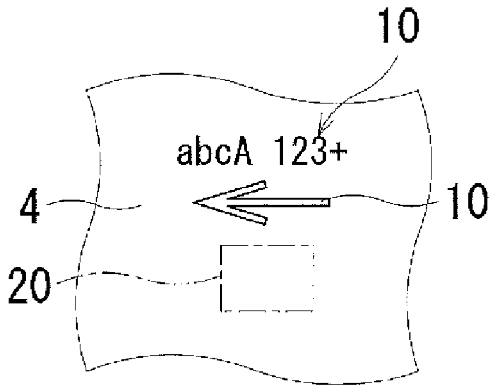
Figure 5D:
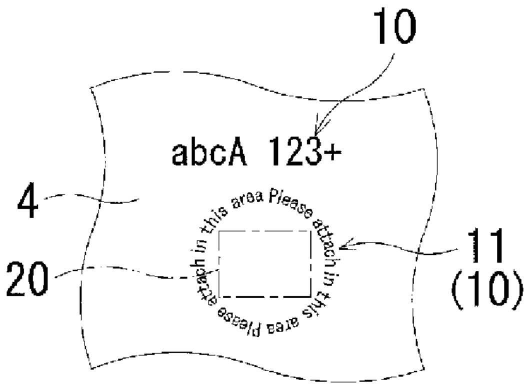

FIG. 4 is a view of a modified example of a pneumatic tire according to an embodiment of the present technology. In FIG. 4, in a tire inner surface 4, an indicator 11 provided in an information display unit 10 is formed. The indicator 11 functions as indication of an attachment region of a sensor unit 20, and indicates an appropriate attachment position of the sensor unit 20. The indicator 11 is disposed at or near the information display unit 10. A case where the indicator 11 is a pattern having a circular shape as illustrated in FIG. 5A and a case where the indicator 11 is formed of angle brackets as illustrated in FIG. 5B can be exemplified. Additionally, as illustrated in FIG. 5C, a case where an arrow is formed as the information display unit 10 to indicate an attachment direction of the sensor unit 20 that has the attachment direction can be exemplified. Further, as illustrated in FIG. 5D, a case where a sentence formed of alphabet letters is disposed in an annular manner is to be used as the indicator 11 can be exemplified. The sensor unit 20 corresponding to the information of the information display unit 10 is attached to a region indicated by the indicator 11 described above. When the indicator 11 is provided in the tire inner surface 4, the attachment region of the sensor unit 20 is clear, and work in attachment of the sensor unit 20 becomes easy.

Figure 6:
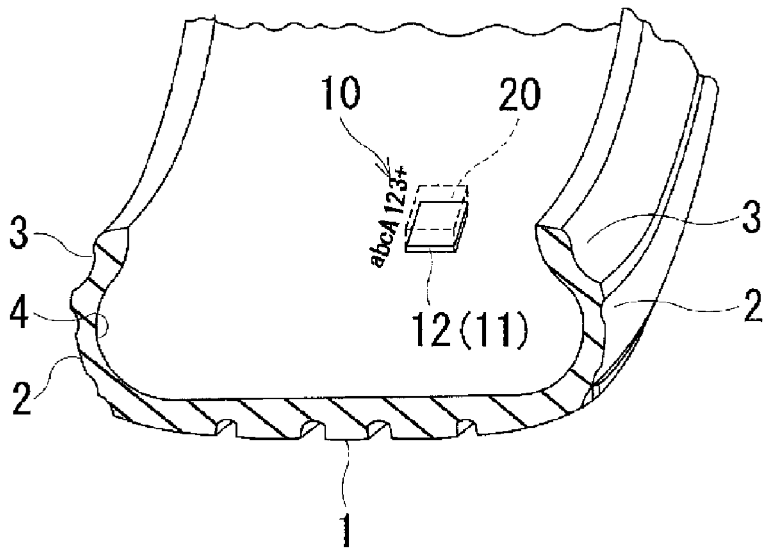
FIG. 6 is a perspective cross-sectional view of another modified example of a pneumatic tire according to an embodiment of the present technology.

FIG. 6 illustrates another modified example of a pneumatic tire according to an embodiment of the present technology. In FIG. 6, in a tire inner surface 4, a platform 12 is formed as one aspect of an indicator 11. The platform 12 corresponds to an attachment region of a sensor unit 20, and indicates an appropriate attachment position of the sensor unit 20. The platform 12 is disposed adjacent to an information display unit 10. In the embodiment illustrated in FIG. 6, the example where the platform 12 is formed of a protrusion portion protruding from the tire inner surface 4 is given. However, the platform 12 may be formed of a recess portion recessed from the tire inner surface 4. The sensor unit 20 corresponding to information of the information display unit 10 is attached to a region formed by the platform 12 described above. The platform 12 is provided in the tire inner surface 4, and thus the attachment region of the sensor unit 20 is clear, and work in attachment of the sensor unit 20 becomes easy.

Figure 7A:
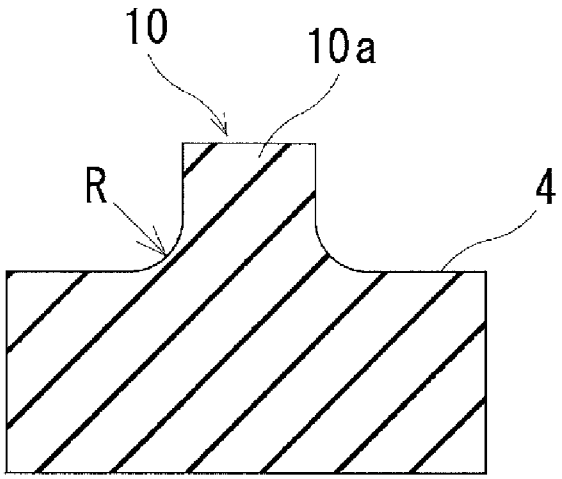
FIGS. 7A and 7B illustrate other modified examples of a protrusion portion and a recess portion of an information display unit of a pneumatic tire according to an embodiment of the present technology, and each of FIGS. 7A and 7B is a cross-sectional view of a modified example.
Figure 7B:
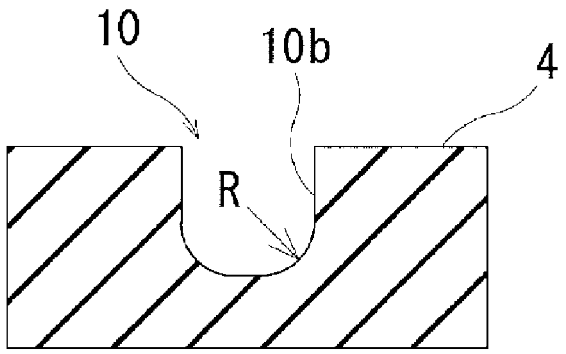

FIGS. 7A and 7B illustrate other modified examples of a protrusion portion and a recess portion of a pneumatic tire according to an embodiment of the present technology. As illustrated in FIGS. 7A and 7B, a root portion of a protrusion portion 10*a* or a recess portion 10*b* of an information display unit 10 has curvature. In other words, a side surface of the protrusion portion 10*a* and a tire inner surface 4 are joined to each other via a smooth curved surface, and a bottom surface and a side surface of the recess portion 10*b* are joined to each other via a smooth curved surface. A radius of curvature R of the root portion preferably ranges from 0.1 mm to 0.8 mm. The radius of curvature R is set as appropriate described above, and thus generation of a crack can be prevented, and the durability of the pneumatic tire can be improved effectively. Additionally, discrimination characteristics of the information display unit 10 is enhanced, and the information display unit 10 is easy to discover. Thus, work efficiency improves. In the embodiment illustrated in FIGS. 7A and 7B, the example where the root portions of the protrusion portion 10*a* and the recess portion 10*b* are provided with the curvature is given. However, the same can be applied to the root portion of the platform 12.

In FIG. 1, the sensor unit 20 is disposed in an inner side of the ground contact edge in a tire width direction. In a case where the sensor 23 detects an amount of wear of the tread portion 1, the sensor unit 20 is disposed as described above, and thus the sensor 23 can acquire tire information accurately.

Additionally, the sensor unit 20 is directly bonded to the tire inner surface 4. In a case where the sensor 23 detects an amount of wear of the tread portion 1, the sensor unit 20 is directly bonded to the tire inner surface 4 as described above, and thus the sensor 23 can acquire tire information accurately.

In the pneumatic tire described above, the adhesive layer 6 has adhesive strength preferably ranging from 0.4 $N/mm^2$ to 100 $N/mm^2$. Particularly, the adhesive layer 6 has adhesive strength more preferably ranging from 5.0 $N/mm^2$ to 80 $N/mm^2$. The adhesive strength of the adhesive layer 6 is set as appropriate as described above, and thus installation work of the sensor unit 20 can be performed easily while maintaining good adhesive strength of the adhesive layer 6. Here, when the adhesive strength of the adhesive layer 6 is less than 0.4 $N/mm^2$, the adhesiveness of the tire inner surface 4 and the sensor unit 20 degrades, and the sensor unit 20 is likely to peel. On the other hand, when the adhesive strength of the adhesive layer 6 is more than 100 $N/mm^2$, replacement work in replacing the sensor unit 20 cannot be performed easily.

Additionally, as the roughness of the tire inner surface 4 in a fixing region of the sensor unit 20, an arithmetic average height Sa preferably ranges from 0.3 μm to 15.0 μm, and/or a maximum height Sz preferably ranges from 2.5 μm to 60.0 μm. Particularly, each of the arithmetic average height Sa and the maximum height Sz more preferably satisfies the value range described above. The roughness of the tire inner surface 4 is set as appropriate as described above, and thus the adhesion area of the tire inner surface 4 and the adhesive layer 6 can be increased, and the adhesiveness of the tire inner surface 4 and the sensor unit 20 can be improved effectively. Note that the arithmetic average height Sa and the maximum height Sz are values measured in accordance with ISO25178, and can be measured by using a commercially available surface property measuring machine (for example, a shape analysis laser microscope or a 3D shape measuring machine). The measurement method may be of any of a contact type and a non-contact type.

Figure 8:
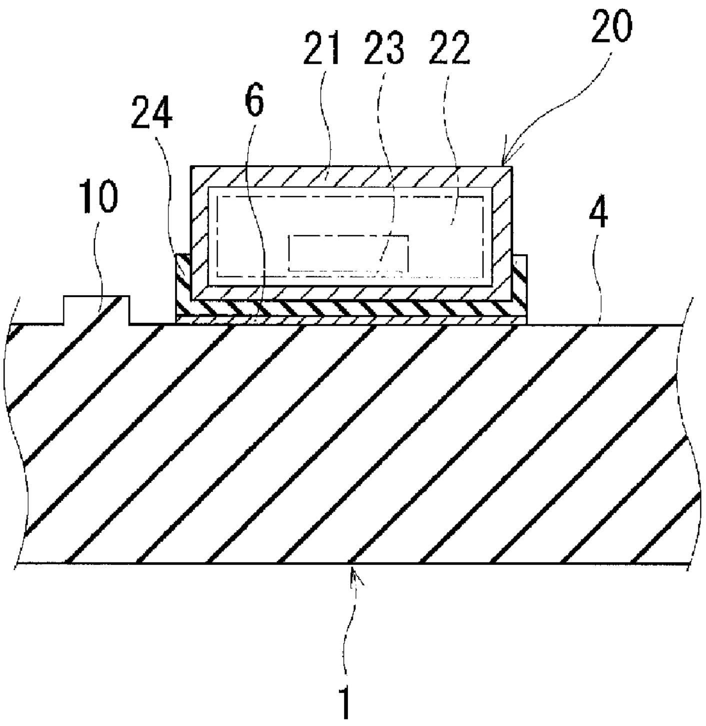
FIG. 8 is a cross-sectional view illustrating another modified example of a sensor unit of a pneumatic tire according to an embodiment of the present technology.

FIG. 8 is a view of a modified example of a pneumatic tire according to an embodiment of the present technology. As illustrated in FIG. 8, a base 24 that holds a sensor unit 20 is inserted between the sensor unit 20 and an adhesive layer 6. Since the base 24 prevents the sensor unit 20 from peeling due to tire deformation, the base 24 functions as a cushioning material. As a material of the base 24, natural rubber (NR), chloroprene rubber (CR), butyl rubber (IIR), ethylene-propylene-diene rubber (EPDM), urethane rubber, NBR, a thermoplastic elastomer, and a thermosetting elastomer are exemplified. When the base 24 is formed of those materials, the base 24 is less likely to be damaged due to tire deformation. Particularly, the base 24 may be formed of rubber having tensile elongation at break of 80% or more. Additionally, the base 24 preferably is in a solid state, more preferably a porous state. When the base 24 is in a porous state, the base 24 has an excellent cushioning effect, and this is advantageous in preventing the sensor unit 20 from peeling due to tire deformation. The base 24 is formed of the material described above, and thus the base 24 can follow tire deformation, and peeling of the sensor unit 20 due to tire deformation can be prevented. Note that in the embodiment illustrated in FIG. 8, the example where the base 24 is formed to have a U shape in a cross-sectional view in the tire width direction is given, but the shape of the base 24 is not particularly limited.

Next, a method of manufacturing a pneumatic tire according to an embodiment of the present technology will be described. In the method of manufacturing a pneumatic tire according to an embodiment of the present technology, a green tire is vulcanized by using a bladder in which the information display unit 10 indicating the information relating to attachment of the sensor unit 20 is engraved. Specifically, the bladder in which a recess portion or a protrusion portion corresponding to the protrusion portion 10*a* or the recess portion 10*b* constituting the information display unit 10 is formed in a bladder outer surface is used. In the vulcanization molding step, an inner surface of the green tire is pressed by the bladder described above. Thus, the information display unit 10 is formed in an inner surface of a pneumatic tire vulcanized. Then, the sensor unit 20 is attached based on the information of the information display unit 10 transferred to the inner surface of the pneumatic tire vulcanized. According to the method of manufacturing a pneumatic tire described above, when the tire inner surface 4 is checked, a specification of the sensor unit 20 can be discriminated easily. Thus, installation work of the sensor unit 20 can be performed accurately and efficiently in accordance with tire size.

In the method of manufacturing a pneumatic tire described above, at least in a fixing region of the sensor unit 20, a thickness of a release agent detected by an electron microscope is preferably equal to or less than 100 μm. Alternatively, at least in the fixing region of the sensor unit 20, an amount of silicon in a release agent detected by an X-ray fluorescent analysis is preferably equal to or less than 10.0 wt. %. Vulcanization is performed by using a bladder including a coating layer formed of the release agent. Alternatively, the release agent is removed by subjecting the inner surface of the pneumatic tire vulcanized to cutting (that is, buffing). Thus, in the fixing region of the sensor unit 20, the thickness or the amount of the release agent described above can be obtained. In a case where a very small amount of the release agent is applied to the tire inner surface 4 as described above, the release agent inhibits permeation of air from the tire inner surface 4, and good air retention properties can be achieved, while the adhesiveness of the tire inner surface 4 and the sensor unit 20 can be ensured sufficiently.

Figure 9:
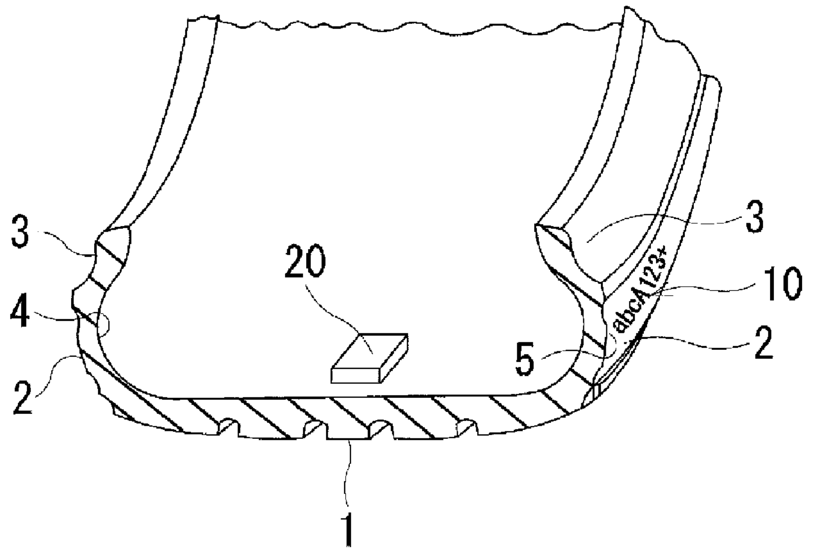
FIG. 9 is a perspective cross-sectional view of another modified example of a pneumatic tire according to an embodiment of the present technology.

In the description given above, the example where the tire inner surface 4 is provided with the information display unit 10 is given. However, as illustrated in FIG. 9, a tire outer surface 5 may be provided with the information display unit 10. In this case, a green tire is vulcanized by using a die including the information display unit 10. A pneumatic tire including the information display unit 10 in the tire outer surface 5 is formed as described above. Subsequently, the sensor unit 20 is attached to the tire inner surface 4, based on the information of the information display unit 10 in the tire outer surface 5. For example, in a case where an attachment position of the sensor unit 20 is not strictly designated, the tire outer surface 5 is provided with the information display unit 10, and the sensor unit 20 is disposed in the tire inner surface 4, based on the information of the information display unit 10. Thus, productivity can be improved.

EXAMPLE

Tires according to Examples 1 to 5 were manufactured. Each tire had a tire size of 275/40R21, and included an information display unit configured to display, in a tire inner surface, information relating to attachment of a sensor unit configured to acquire tire information. The information display unit was formed of a protrusion portion, and a radius of curvature R of a root portion of the protrusion portion was set as indicated in Table 1.

Those test tires were evaluated by the following test methods with regard to discrimination characteristics and the presence of a crack. The results were shown in Table 1.

Discrimination Characteristics:

Each test tire was mounted on a wheel having a rim size of 21×9.5J, and ten testers evaluated noticeability of the information display unit formed in the tire inner surface. The evaluation results were indicated by using an average value of 10-level evaluation values given by the ten testers. A larger evaluation value indicates more excellent discrimination characteristics of the information display unit.

Presence of Crack:

Each test tire was mounted on a wheel having a rim size of 21×9.5J, and a traveling test was performed by using a drum testing machine under conditions of a traveling speed of 81 km/h, air pressure of 120 kPa, a load corresponding to 102% of the maximum load capacity, and a traveling distance of 6480 km. Subsequently, the presence of a crack generated in an innerliner at or near the information display unit was confirmed.

TABLE 1

| | Example 1 | Example 2 | Example 3 | Example 4 | Example 5 |
|---|---|---|---|---|---|
| Radius of curvature R of root portion of protrusion portion (mm) | 0 | 0.1 | 0.5 | 0.8 | 0.9 |
| Discrimination characteristics | 8.0 | 8.0 | 7.8 | 7.4 | 6.8 |
| Presence of crack | Yes | No | No | No | No |

As can be seen from Table 1, in each of the pneumatic tires according to Examples 1 to 5, discrimination characteristics decreased more as the radius of curvature R of the root portion of the protrusion portion was larger. A crack tended to be generated as the radius of curvature R was smaller. Particularly, in each of the pneumatic tires according to Examples 2 to 4, discrimination characteristics were good, and generation of a crack was not found.

The invention claimed is:

1. A pneumatic tire, comprising:

an information display unit configured to display, in a tire surface, information relating to attachment of a sensor unit configured to acquire tire information, the information display unit comprising one or more alphanumerics, numerals, symbols or patterns for discriminating a specification of the sensor unit, and an attachment region for attachment of the sensor unit, the attachment region being discrete and spaced apart from the one or more alphanumerics, numerals, symbols or patterns, wherein the information display unit is disposed in a tire inner surface, the information display unit comprises an indicator being an indication of the attachment region of the sensor unit, a platform corresponding to the attachment region of the sensor unit is formed as the indicator, the platform being formed of a protrusion portion or a recess portion and the sensor unit being attached to the protrusion portion or the recess portion, and a root portion of the platform having a curvature in a tire cross-sectional view, the root portion being a transition from the tire inner surface surrounding the platform to platform walls defining the protrusion portion or the recess portion of the platform.

2. The pneumatic tire according to claim 1, wherein the information display unit is formed of a protrusion portion and/or a recess portion.

3. The pneumatic tire according to claim 2, wherein a root portion of the protrusion portion and/or the recess portion constituting the information display unit has curvature.

4. The pneumatic tire according to claim 1, wherein the tire further comprises at least one additional sensor unit and at least one of the sensor unit or the at least one additional sensor unit corresponding to information of the information display unit is fixed to a tire inner surface.

5. The pneumatic tire according to claim 1, wherein the sensor unit is bonded to a tire inner surface via an adhesive layer.

6. The pneumatic tire according to claim 5, wherein the adhesive layer has adhesive strength ranging from 0.4 $N/mm^2$ to 100 $N/mm^2$.

7. The pneumatic tire according to claim 5, wherein the adhesive layer is formed of a cyanoacrylate-based adhesive.

8. The pneumatic tire according to claim 1, wherein the sensor unit is disposed in an inner side of a ground contact edge in a tire width direction.

9. The pneumatic tire according to claim 1, wherein the sensor unit is directly bonded to a tire inner surface.

10. The pneumatic tire according to claim 1, wherein a base is inserted between the sensor unit and an adhesive layer.

11. The pneumatic tire according to claim 1, wherein, as roughness of a tire inner surface in a fixing region of the sensor unit, an arithmetic average height Sa ranges from 0.3 μm to 15.0 μm, and a maximum height Sz ranges from 2.5 μm to 60.0 μm.

12. The pneumatic tire according to claim 1, wherein, as roughness of a tire inner surface in a fixing region of the sensor unit, an arithmetic average height Sa ranges from 0.3 μm to 4.5 μm, and a maximum height Sz ranges from 2.5 μm to 60.0 μm.

13. The pneumatic tire according to claim 1, wherein the information display unit is a laser engraving on the tire surface.

14. The pneumatic tire according to claim 1, wherein the information display unit comprising one or more of the alphanumerics or the numerals.

15. A method of manufacturing a pneumatic tire, comprising: vulcanizing a green tire by using a bladder in which an information display unit is provided in an outer surface of the bladder, the information display unit being configured to display information relating to attachment of a sensor unit configured to acquire tire information, the information display unit comprising one or more alphanumerics, numerals, symbols or patterns for discriminating a specification of the sensor unit corresponding to a size of the pneumatic tire; and fixing a sensor unit to an inner surface of a pneumatic tire vulcanized, based on information of the information display unit transferred to a tire inner surface, the sensor unit being fixed at an attachment region of the sensor unit that is discrete and spaced apart from the one or more alphanumerics, numerals, symbols or patterns; wherein the information display unit comprises an indicator being an indication of the attachment region of the sensor unit, the method further comprises forming a platform corresponding to the attachment region of the sensor unit as the indicator, the platform being formed of a protrusion portion or a recess portion and the sensor unit being attached to the protrusion portion or the recess portion, and a root portion of the platform is formed having a curvature in a tire cross-sectional view, the root portion being a transition from the tire inner surface surrounding the platform to platform walls defining the protrusion portion or the recess portion of the platform.

16. The method of manufacturing a pneumatic tire according to claim 15, wherein at least in a fixing region of the sensor unit, a thickness of a release agent is equal to or less than 100 μm, the thickness being detected by an electron microscope.

17. The method of manufacturing a pneumatic tire according to claim 15, wherein at least in a fixing region of the sensor unit, an amount of silicon in a release agent is equal to or less than 10.0 wt. %, the amount being detected by an X-ray fluorescent analysis.

* * * * *